H. H. Smith.
Mower.
No. 2,399. Reissued, Nov. 27, 1866.
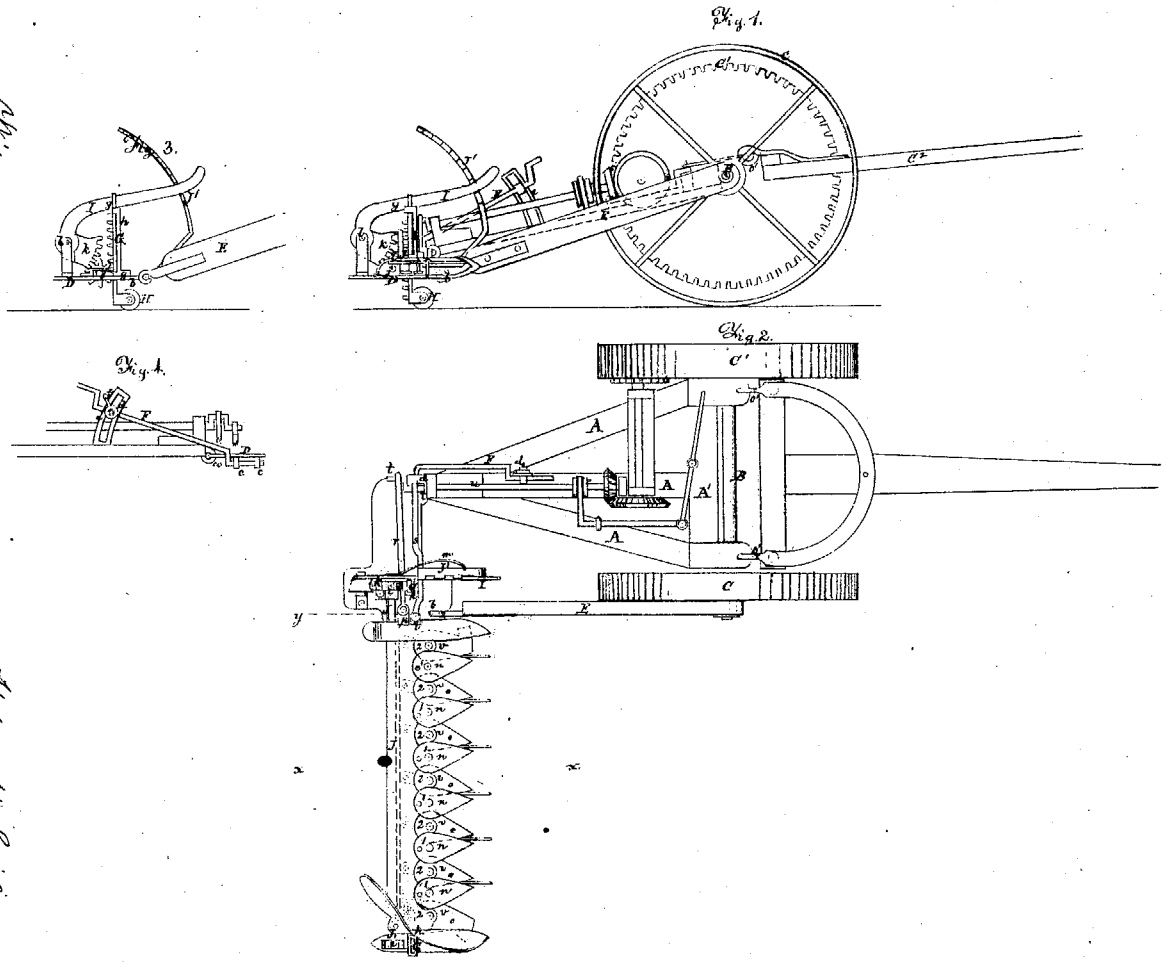
Witnesses
R. Leech
N. B. Smith
Hobart H. Smith.
by his Attorney
A. M. Smith United States Patent Office

IMPROVEMENT IN HARVESTERS.

HOBART H. SMITH, OF CARLISLE, PENNSYLVANIA, ASSIGNEE BY MESNE ASSIGNMENTS OF C. M. LUFKIN.

*Letters Patent No.* 18,173, *dated September* 8, 1857; *reissue No.* 2,399, *dated November* 27, 1866.

SPECIFICATION.

TO ALL WHOM IT MAY CONCERN:

Be it known that C. M. LUFKIN, of Acworth, in the county of Sullivan, and State of New Hampshire, invented a certain new and useful Improvement in Harvesting Machines; and I do hereby declare the following to be a full, clear, and exact description of the same, reference being had to the accompanying drawing, making part of the same, in which—

Figure 1 is a transverse section of a harvesting machine, embracing said improvement, taken in line *x x*, fig. 2.

Figure 2 is a plan or top view of the same.

Figure 3 is a transverse section of the finger bar, taken in line *y y*, fig. 2; and Figure 4 is a detached view, showing the hinge which connects the finger bar with the frame, together with the means employed for adjusting the angle of the cutters.

Similar letters of reference indicate corresponding parts in the several figures.

The improvement embraced in this application consists in combining, in a two-wheel side-draught machine, a main frame arranged between the wheels and connected to the main axle of the machine, with a laterally projecting, hinged cutting apparatus, connected, by means of a hinge at its inner or heel end only, to said frame in such manner that each end of the cutting apparatus, independently of the other end, is free to fall below and to rise above the plane on which the main carrying-wheels rest or are passing, for the purposes hereinafter specified.

It further consists in the employment, in a two-wheel side-draught machine, of a main frame, which is connected to the main axle or gear centre, and which extends beyond the periphery of the driving-wheel at one end only, in combination with a laterally projecting hinged cutting apparatus, for the purpose hereinafter specified.

It further consists in the employment, in a two-wheel side-draught machine, of a main frame, connected at one end to and vibrating about the main axle or gear centre of the machine, in combination with a cutting apparatus hinged to the other end of said frame, for the purpose hereinafter specified.

It further consists in the combination, in a two-wheel side-draught machine, of a laterally projecting hinged cutting apparatus, with one end of a drooping or vibrating frame, which is connected at its other end to the main axle or gear centre of the machine, for the purpose hereinafter specified.

And it further consists in the combination, in a two-wheel side-draught machine, of a vibrating main frame, arranged between the wheels and connected to the main axle or gear centre, with a laterally projecting cutting apparatus, which is hinged by its inner end to said frame, for the purpose hereinafter specified.

To enable others to construct and use said improvement I will proceed, with reference to the drawing, to describe how the same may be carried out in practice.

In said drawing, B represents the main axle of the machine, supported by two main carrying-wheels C C′, mounted on the opposite ends of said axle, one of which, C′, is the driving-wheel, which is keyed to the shaft and revolves therewith, while the other, C, revolves loosely on said axle independently of wheel C′. A is the main frame, arranged between the wheels C C′, and connected at one end to the main axle B in such manner as to be free to vibrate around the same as a centre and allow the opposite end to droop and conform to the undulations in the surface of the ground over which the cutting apparatus, connected thereto, passes as the machine is drawn forward. The frame A is shown, in this instance, as made in a triangular form, consisting of longitudinal bars or pieces A A A, bolted or otherwise firmly and rigidly secured to each other at one end of the frame, and similarly secured at the other end to a transverse bar or piece, A′, in such manner as to mutually brace and support each other in sustaining the lateral strain or drag consequent upon the employment of a cutting apparatus which projects from one side only thereof. That end of said frame which is connected to the axle is provided with perforated ears or lugs, which surround said axle and are free to turn thereon to accommodate the vibration of the frame. D is the finger bar, which is attached, by means of a hinge at its inner or heel end, to the vibrating or drooping end of frame A in such manner as to project only on one side of said frame. The hinge which connects the heel end of the finger bar with the frame consists, in this instance, of a hook, *a*, on the frame, which passes loosely through an eye or perforation in the end of the bar, forming a kind of universal joint, the hook serving as a centre about which the outer end of the bar may vibrate, rising and falling to conform to the surface of the ground independently of the inner or heel end.

From the foregoing description it will be seen that by the attachment of the cutting apparatus to the freely vibrating end of the frame said cutting apparatus is allowed to fall below and to rise above the plane on which the driving and main carrying-wheels C and C′ rest or are passing; and by the further employment of a hinge connection between the finger bar and the frame, in the manner explained, each end of the cutting apparatus is rendered independent of the other in rising and falling to conform to the surface of the ground over which it is drawn.

The wheel C′ is the driving-wheel, and is provided with an internally cogged rim or wheel, by the rotation of which with wheel C′ motion is imparted to a counter-shaft mounted on the main frame on a line parallel with the main axle or drive-wheel centre, and at a proper distance therefrom to cause a pinion of suitable size on one end thereof to mesh with the cogs on the driving-wheel. The counter-shaft has on its other end a bevel-wheel, which gears with a bevel pinion on the crank shaft, through which motion is communicated to the cutters in the usual manner. The crank shaft is provided with a feathered sliding clutch, by means of which the cutters may be thrown into and out of action when desired. By arranging the gearing and shafts in the manner explained, or in any equivalent manner, upon a vibrating frame whose centre of vibration is coincident with the centre of rotation of the driving-gear-wheel, the relation of parts and the action of the cutters are not interfered with by the movements of the frame in allowing the cutting apparatus to conform to the surface of the ground.

A brace or draw bar, E, is connected at one end to and vibrates about the main axle or gear centre, and at its other end is attached, by means of a hinge, to the cutting apparatus for properly supporting the same and sustaining it in its working position at right angles to the path of the machine, which is drawn forward over the ground by means of a pole or tongue connected to the frame at its forward end in the manner shown in the drawing. These, however, with other parts of the machine, forming the subject-matter of and being fully described in other applications of even date herewith, do not require further description here.

The object and advantages of the improvement hereinabove described will be readily understood. Prior to this invention two-wheel machines, employing a cutting apparatus which was hinged at one end to, and projected laterally from, the main frame of the machine by which it was drawn forward over the ground, and in which the cutting apparatus was adapted to conform to the surface of the ground at each end, independently of the other end and of the vertical movements or vibrations of the main axle of the machine, the frame was made to extend each way, in the direction of its length, beyond the periphery of the driving or main carrying-wheels, and was made to surround one or both of said wheels, the longitudinal bars or pieces of the frame being connected to each other at each end by transverse bars or pieces in front and rear of the wheels, this construction being necessary to give the requisite strength and rigidity to the frame where its supports were on the axle on opposite sides of the wheel or wheels; and where the wheels were made of sufficient diameter to easily surmount stones or other obstructions, and were sufficiently far apart to give the requisite steadiness to the machine in passing over uneven ground, the frame was necessarily large and cumbrous, seriously affecting the draught of the machine and rendering it large and unwieldy. By the construction herein described the necessity for extending the frame beyond the periphery of the carrying-wheels, except at one end, for the attachment of the cutting apparatus, is dispensed with. The wheels are placed at a sufficient distance from each other to secure the desired steadiness to the machine in passing over uneven ground, and may be made of any desired or convenient diameter for passing over obstructions without necessitating a corresponding enlargement of the frame. The frame is adapted to be located between the wheels, while at the same time the strength and rigidity of parts required for adapting it to the support of a hinged laterally projecting cutting apparatus, are secured. A strong and substantial frame is obtained, at a considerable saving in the cost and weight of materials required for its construction. The size of the machine itself is materially reduced, and it is rendered of light draught and is easily handled.

What is claimed under this patent as the invention of C. M. Lufkin, is—

1. The combination, in a two-wheel side-draught machine, of a main frame arranged between the wheels and connected to the main axle, with a laterally projecting hinged cutting apparatus, connected to said frame by means of a hinge at its inner or heel end only, in such manner that each end of the cutting apparatus, independently of the other, is free both to fall below and to rise above the plane on which the main carrying-wheels are passing, for the purpose specified.

2. The employment, in a two-wheel side-draught machine, of a main frame, which is connected to the main axle or gear centre, and which extends beyond the periphery of the driving-wheel at one end only, in combination with a laterally projecting hinged cutting apparatus, for the purpose specified.

3. In a two-wheel side-draught machine, a main frame, connected at one end to and vibrating about the main axle or gear centre, in combination with a cutting apparatus hinged to the other end of said frame.

4. In a two-wheel side-draught machine, a laterally projecting cutting apparatus hinged to one end of a frame, which is connected at its other end to and vibrates about the axle or gear centre of said machine.

5. In a two-wheel side-draught machine, a vibrating frame arranged between the wheels, and connected to the main axle or gear centre, in combination with a laterally projecting cutting apparatus, which is hinged at one of its ends to said frame.

In testimony whereof witness my hand this 22d day of October, 1866.

HOBART H. SMITH.

In presence of—
T. F. GOUCHER,
S. D. HOUSTON.